AUTOMATIC NOISE JAMMING MULTI-CARRIER F.M. SYSTEM

Filed May 2, 1962 2 Sheets-Sheet 1

INVENTORS
KAY H. BARNEY
LEWIS J. GRABER
BY
S. C. Yeaton
ATTORNEY

AUTOMATIC NOISE JAMMING MULTI-CARRIER F.M. SYSTEM

Filed May 2, 1962 2 Sheets-Sheet 2

INVENTORS
KAY H. BARNEY
LEWIS J. GRABER
BY
S. C. Yeaton
ATTORNEY 3,225,300

AUTOMATIC NOISE JAMMING MULTI-CARRIER F.M. SYSTEM

Kay H. Barney, Searingtown, and Lewis J. Graber, Westbury, N.Y., assignors to Sperry Rand Corporation, Great Neck, N.Y., a corporation of Delaware Filed May 2, 1962, Ser. No. 191,993
13 Claims. (Cl. 325—132)

This invention relates to radio frequency signal generators and more particularly it concerns apparatus for producing a plurality of modulated signals having different carrier frequencies.

An important area within the general field of radio communications is that which concerns beacons or other responder type apparatus. Extensive use of such equipment can be seen in the telemetry and countermeasures arts.

In most responder type apparatus, a signal generator must be provided which is capable of producing any one or more of several possible output signal frequencies. Although a number of individual oscillators each tuned to a discrete frequency can provide this required flexibility, their weight and complexity makes them undesirable for a great many of the telemetry and countermeasures applications mentioned.

Relatively compact multifrequency oscillators capable of producing signals at one or at several frequencies simultaneously are known to the art. These devices generally comprise a single wide frequency range amplifier in conjunction with a plurality of separately tuned, parallel connected, feedback loops which can be individually connected or disconnected according to the frequencies desired. The feedback loops usually include signal amplitude limiting means in order to prevent any excess gain in one loop from favoring its nominal frequency to such an extent that oscillations are suppressed in any of the other loops.

A major difficulty associated with these multifrequency oscillators lies in their inherent interchannel sensitivity, wherein oscillations in one feedback loop may tend to produce or to terminate oscillations in an adjacent loop. As a result, it has generally been necessary to limit operation of these oscillators to certain fixed and rather widely separated frequencies. This, of course, limits their modulation and band coverage capabilities, making them virtually useless in the telemetry and countermeasures applications mentioned.

A further disadvantage of the above multifrequency oscillators lies in the fact that the signal limiting means in each feedback loop prevents use of full amplifier power when operating on fewer than all of the available feedback channels. It is an important requirement, especially in countermeasures systems, that the signal generator be capable of concentrating its total output power into those frequency bands at which the system happens to be transmitting. Also for effective and versatile jamming, the various frequency bands must be closely aligned or even overlapping. Yet the system must be capable of delivering high amplitude noise over the entire spectrum of each band without exceeding the band limits and without inducing oscillations in adjacent bands.

It is an object of this invention therefore to provide an improved phase and frequency modulated multiple carrier signal generator.

It is another object to provide a multiple frequency generator capable of producing closely aligned or overlapping frequency bands without interchannel interference.

Another object is to provide a high frequency noise signal generator capable of producing high amplitude frequency modulated noise signals within a sharply defined frequency spectrum.

A further object is to provide an improved signal responsive frequency jamming system.

A still further object is to provide a jamming system wherein the total power capacity of a single source is concentrated most efficiently in the frequency ranges of the signals to be jammed.

These and other objects are realized in the following manner. A plurality of regenerative oscillatory loops are provided, each loop being tuned to a different frequency. The loops all share a common amplification and modulation loop segment. A wide frequency range amplifying means is located in the common segment to supply power to each of the loops. Means such as a variable phase shifter is provided in the common loop segment to change its electrical length. By actuating the length changing means, a modulating frequency is superimposed upon the signals in those loops which happen to be oscillating at the time. Because the loop length changing means is located in the common segment, the loop lengths are changed coherently and the difference between them remains fixed. Also, because frequency modulation is produced by changing loop length, the frequencies in the loops are likewise changed in a coherent manner. Thus a time-sharing effect is produced whereby frequency modulation may be accomplished to such an extent that the frequency bandwidth of one loop may overlap the bandwidth of an adjacent loop without interfering with the normal operation of the adjacent loop.

More specific forms of the invention utilize noise modulation for jamming purposes. Means are also provided whereby signals external to the system will initiate oscillation for jamming purposes. Means are also provided circulating in one loop will not initiate oscillation in an adjacent loop even though they may extend into the frequency bandwidth of the adjacent loop. Means are further provided to adjust the maximum gain of each loop in accordance with the number of loops in actual oscillation. This permits concentration of the entire amplifier output power in the particular frequency bands being generated.

Referring now to the figures.

Figure 1:
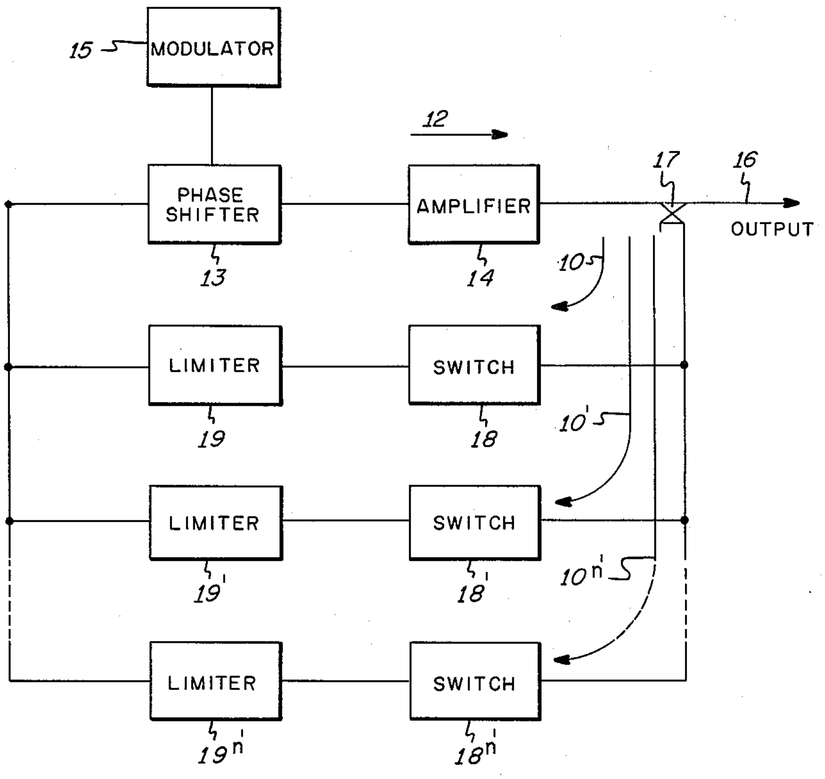
FIG. 1 is a block diagram illustrating a simplified embodiment of the invention.

The embodiment of FIG. 1 illustrates the principles of the present invention. In this embodiment a plurality of regenerative oscillatory loops, 10, 10', . . . 10n', each tuned to a different frequency, share a common amplifying and modulating loop segment 12. This segment includes a line length changing or phase shifting means 13 and a signal amplifying means 14. A source of modulating voltages 15 is provided to actuate the phase shifting means 13. This effectively changes the electrical length of the various loops, thereby changing their respective nominal or favored oscillatory frequencies. The amplifying means 14 provides transmitter power at an output line 16 and a certain amount of internal power, via a coupling means 17, sufficient to sustain oscillations.

The remaining portion of each oscillatory loop is of a discrete fixed electrical length. Each remaining portion includes a switching means 18 and a signal amplitude limiter 19. Each switching means is operable to change the overall gain characteristic of its respective oscillatory loop above and below unity in accordance with applied signals of a given amplitude. As will be explained further, such applied signals may be the very signal being circulated through the loop. It is well known that one criterion for regenerative oscillation is that the overall loop gain be maintained above unity. The switching means of the present embodiment are effective to produce unity gain and consequent oscillation at any one or several of the frequencies to which the various oscillatory loops are tuned.

The signal amplitude limiter 19, provided in each loop, serves to prevent its gain from exceeding that of any other oscillating loop. Inasmuch as the present device is to be operated at a multiplicity of frequencies, the signal amplifying means must of necessity be capable of amplification over a wide frequency band. Most known amplifiers, however, when operated at full power, begin to saturate and exhibit a non-linear operating characteristic which causes a variation in gain as a function of frequency. This would normally cause the loop oscillating at the frequency of highest gain to regenerate signals of this frequency at such a rate that all available amplifier power would be concentrated in the production of those signals. Correspondingly, signals at all other frequencies would be suppressed. By limiting the maximum signal output of each remaining loop portion, a gain equalization is achieved which prevents the excessive build-up of signals at any one frequency.

Oscillations are produced when one or more of the switches are activated to provide a gain greater than unity in their respective loops. Once the switches are closed, either externally supplied signals or thermal noise generated within the system itself becomes amplified and tends to recirculate and build up as a sustained oscillation within those loops. Maximum overall gain, however, is provided only at those frequencies whose wavelengths are integral submultiples of the respective electrical lengths of the oscillating loops. Signals whose frequencies are removed from these favored frequencies are of a different phase each time they traverse the loop. As a result, the loop regenerative effect upon these signals is degraded, and overall loop gain for these frequencies decreases in proportion to the amount by which they are removed from the favored frequency. Because of the constant recirculation and amplification in the oscillatory loops, the signal at the favored frequency soon suppresses all other frequencies in the manner previously explained.

Each of the oscillatory loops is of a different electrical length. Each therefore is an integral multiple of wavelengths of a different frequency, and when its gain is raised above unity, as by closing its switching means, it will support oscillations at that frequency. Since the variable phase shifter is in a segment common to every loop, it is effective simultaneously to change the length of each loop in a similar manner. This changes the favored frequency of each loop by an amount dependent upon the extent to which its line length is changed. The net result is a simultaneous and like change in each of the frequencies being generated.

An important aspect of the present invention is the avoidance of interchannel interference. It is conceivable that in frequency modulating the device, signal sidebands may be developed in one loop which are so far removed from its nominal frequency that they extend into the operating band of an adjacent loop. By incorporating a phase shift type modulator in the common loop segment 12, a coherence is established such that the overlapping frequency bands are always time-shared.

Figure 2:
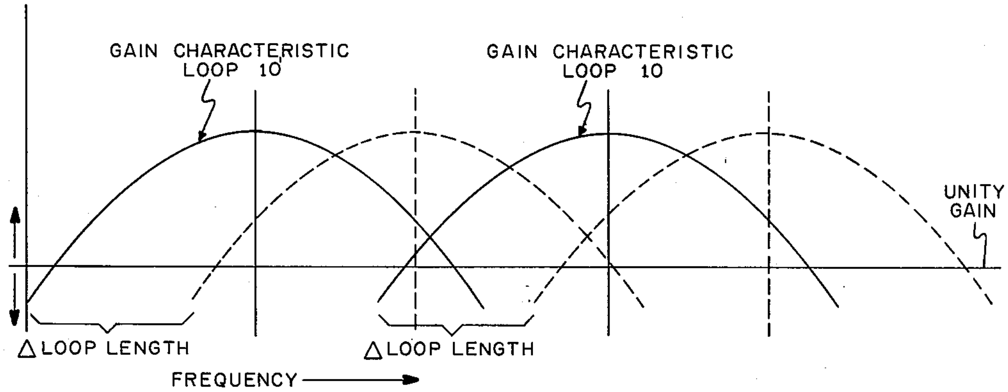
FIG. 2 is a diagram useful in understanding the operation of FIG. 1.

FIG. 2 illustrates the manner in which this phenomenon takes place. In FIG. 2, frequency is shown plotted against overall loop gain for the first two loops of the system shown in FIG. 1. It is assumed for purposes of simplicity that the switching means in each loop is closed to permit oscillations. It is also assumed that the only effect causing differences in gain at different frequencies is due to the degraded regenerative effect described in reference to frequencies removed from the favored frequency. Because of the difference in loop lengths, it is seen that the favored frequency of each loop is at a different value. However, since oscillations can occur in either loop wherever the overall loop gain is above unity, each loop is capable of regenerative oscillations at frequencies so far removed from the favored frequencies that a finite band exists wherein the same frequency may propagate in both loops. Without modulation, oscillations occur in each loop at its favored frequency. With phase modulation, however, the length of each loop is correspondingly changed as is its respective favored frequency. The net effect is a simultaneous and coherent horizontal shift of the main curves for each loop.

Assuming that the phase shifter in the common element is being adjusted to shorten the overall length of each loop, the favored frequency of each begins to increase. Depending upon the rate of increase, signal sidebands are developed at frequencies higher than the favored frequencies. It is conceivable that these sidebands might extend over into the portion of the adjacent loop which exhibits above unity gain. However, because of the fact that the adjacent loop gain-frequency characteristic itself is being shifted in the same direction, the gain for that loop at the frequency in question is decreased below unity and the loop will not therefore support oscillations at that frequency. Correspondingly, as the modulating voltage shifts the loop characteristics in the opposite direction, a similar effect is produced. It is to be noted that at any instant the favored frequencies of the two loops are always maintained at a fixed frequency separation irrespective of the modulating rate. For this reason, even noise modulation may be produced without interchannel interference.

Figure 3:
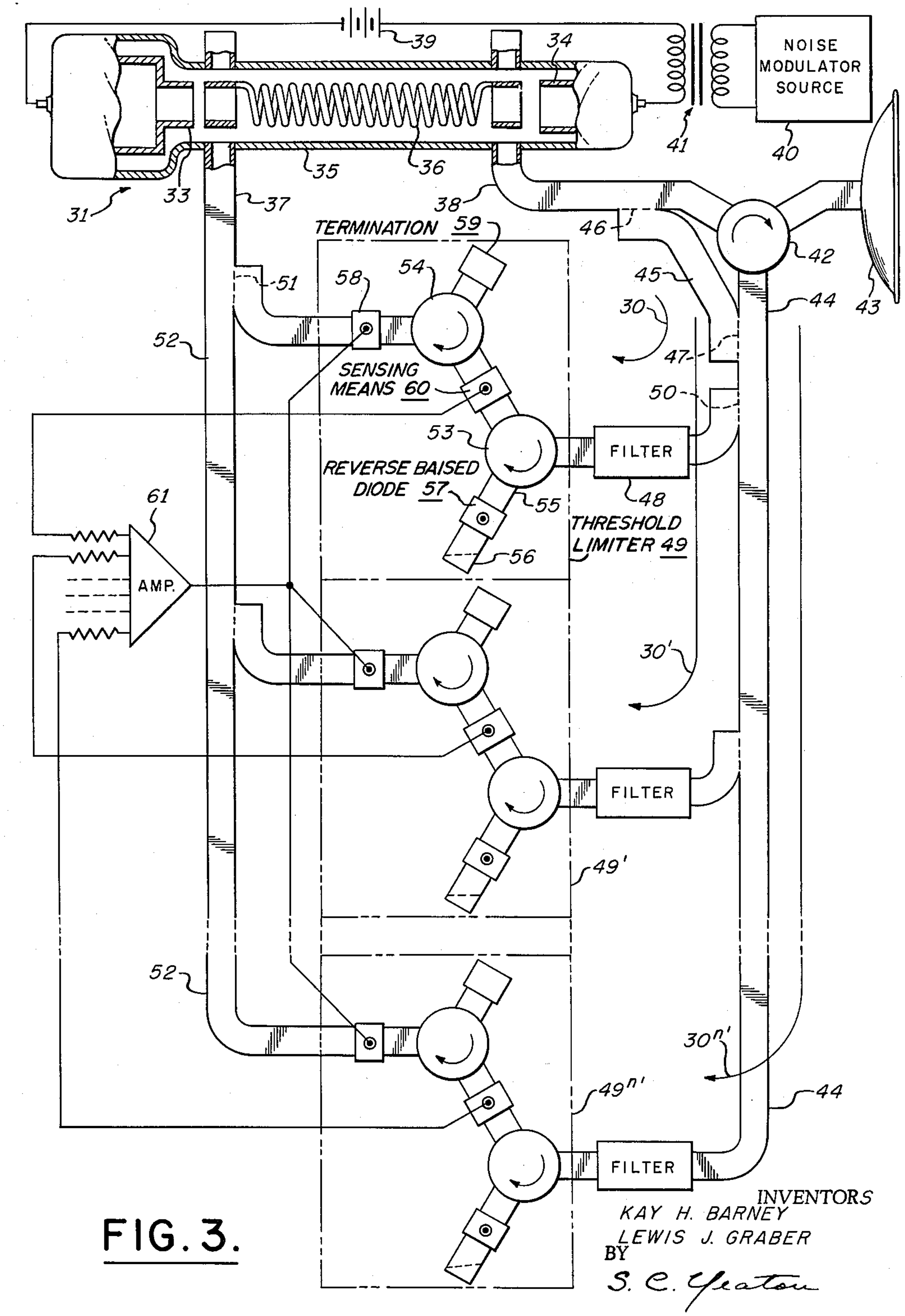
FIG. 3 is an illustration of a preferred embodiment of the invention.

Referring now to FIG. 3, a preferred embodiment of the invention is seen in the environment of a signal activated noise jamming system. This system is useful at radio frequencies for automatically concentrating the entire output capacity of a single microwave amplifier into a small frequency band within which an enemy would be communicating. The device includes a plurality of regenerative oscillatory loops, 30, 30′, . . . 30$n'$, sharing a common amplifier 31. The common amplifier, in the present embodiment, is shown as a traveling wave tube, although it is to be understood that any other wide frequency range amplifying means may be used equally as well. The amplifier 31 may be seen to include a cathode 33 and an anode 34 for producing an electron stream within an evacuated envelope 35. A slow wave structure such as a helix 36 is provided around the electron beam for producing an interaction effect whereby energy from the beam is transferred to the high frequency fields being guided by the helix. High frequency energy is supplied to one end of the helix via an input waveguide 37, and the amplified energy from the opposite end of the helix is obtained by means of an output waveguide 38. A voltage source 39 is connected to provide sufficient potential difference between the anode and cathode to maintain the electron beam. A noise modulation source 40 is provided with an output coupled via a transformer 41 to the anode 34 or helix 36 of the amplifier. The purpose of the noise source is to change the anode potential which in turn changes the electrical length of the helix. This produces a frequency modulation effect similar to that described in connection with FIG. 1.

The amplifier output is connected to one port of a Y-junction circulator 42. Another port of the same circulator is connected to an antenna 43 which is capable of both transmitting and receiving radio signals over the entire spectral range of the system. The third port of the Y-junction circulator is connected to a common feed line 44 which supplies energy to the remaining portion of each of the oscillatory loops. The direction of circulation in the circulator is seen to be such that signals from the amplifier 31 are directed into the antenna 43 while signals from the antenna are directed into the common feed line 44. A bypass line 45 is connected by means of directional couplers 46, 47 between the amplifier output waveguide 38 and the common feed line 44. The purpose of the bypass line is to divert a small percentage of the amplifier output signal power back into the oscillatory loops in order to maintain regenerative oscillation. Most of the amplifier output power, however, passes through the circulator and into the antenna to be transmitted as jamming signals. External signals such as generated by enemy communications systems are received by the antenna and directed through the circulator into the common line where they are used to switch on a particular oscillatory loop having similar frequency characteristics.

Each oscillatory loop includes a bandpass filter 48 and a threshold-limiter arrangement 49 connected by means of directional couplers 50, 51 between the common feed line and a common return line 52. The common return line is connected to amplifier input waveguide 37. Unlike many low frequency oscillators, the oscillatory loops in the present case are many times the wavelength of the signal circulating through them. Because of this it is conceivable that a loop of a given length will simultaneously regenerate and maintain a plurality of frequencies of various modes. The bandpass filters are provided to restrict each loop to a single mode of oscillation.

The filter in each loop serves a still further purpose. It will be noted that the slope of the curves in FIG. 2 which define the frequency sensitivity of the various loops of the first embodiment are somewhat shallow. By inserting a bandpass filter into a given loop, its overall gain-frequency characteristic becomes considerably sharper even though the filter itself may have a rather shallow gain-frequency characteristic. This is because the overall loop gain at any frequency is equal to the product of the gains of its individual components. The filter and loop frequency characteristics therefore cooperate to define a sharply rising overall gain-frequency characteristic. This characteristic is even further sharpened by reason of the cumulative build-up of the oscillating signals as they are amplified and recirculated within the high gain loop.

The threshold-limiter arrangement 49 in each loop includes a pair of Y-junction circulators 53, 54 having mutual connecting ports. A second port of the first circulator 53 is connected to the bandpass filter 48 in its respective oscillatory loop while the third port is connected to a threshold sensing switch 55. In the present case, this switch takes the form of a length of transmission line or waveguide extending from the circulator and terminating in a nonreflecting impedance 56. Between the circulator and the impedance is a reverse biased diode such as a varactor diode 57. Depending upon the amount of bias on the varactor diode, a high impedance is presented to incident microwave energy below a first prescribed power level. This low power passes beyond the varactor diode and becomes absorbed in the waveguide termination. Once the first prescribed power level is exceeded, however, the diode bias is overcome and the diode presents a substantially short circuit to the excess microwave power. The direction of signal circulation of the first Y-junction circulator is chosen to permit signals from the bandpass filter 48 to pass into the threshold sensing switch 55. The excess power reflected back from the switch then passes out the first port and into the second circulator 53.

One port of the second circulator is connected via a waveguide containing a second varactor diode 58 to the common return line 52. Another port of the second circulator is connected to a further nonreflecting termination 59. The second varacator diode 58 is reverse biased to present a low impedance to incident microwave signals below a second prescribed power level, and to reflect microwave power above that level. The direction of circulation of the second Y-junction circulator 54 is chosen to permit microwave energy from the first circulator 53 to become incident upon the second varactor diode 58, and to permit the excess power reflected from that diode to be directed into the nonreflecting termination 59.

Operation of the system shown in FIG. 3 is initiated when external signals of one or more frequencies are received via the antenna 43. These signals propagate through the common feed line 44 to each of the oscillatory loops. Since the modulation source 40 is in continuous operation, the electrical length of each loop also continuously changes as does its gain-frequency characteristics. When the gain-frequency characteristic of a particular loop becomes such that a loop gain in excess of unity is presented to the signals of a given frequency from the antenna, those signals begin to circulate in regenerative fashion in the loop, if they are initially of sufficient power to overcome the bias on the first varactor diode 57. The regeneration causes the signals to become amplified and self sustaining, and the continuous noise modulation causes the recirculating signal to be converted into a barrage of frequency modulated noise having a frequency spectrum equal to that of the bandpass filter 48.

The coherence characteristics possessed by the system shown in FIG. 1 are also present in the preferred embodiment of FIG. 3. It is possible to noise modulate the present system to an extent that the entire frequency spectrum of each bandpass filter 48 is completely utilized. Yet these filters may have overlapping characteristics without initiating oscillations in a neighboring loop. As in the first embodiment, a signal will propagate in an oscillatory loop only when the loop gain for that signal exceeds unity. Whenever the modulation of one loop causes production of sideband frequencies which may fall within the passband of an adjacent loop, that same modulation is changing the electrical length of the adjacent loop so that at the particular instant that adjacent loop is not conductive to recirculating that frequency. On the other hand, externally generated signals, which are supplied via the antenna, are not so coherently related in frequency to the signals being circulated in the oscillatory loops. If these external signals persist therefore, for a duration at least equal to the recirculation period of the loops (approximately forty micro-seconds in the present case), and are of sufficient amplitude to overcome the threshold bias set by the first varactor diode 57, they will excite an appropriate loop into oscillation in the manner described.

The threshold switching diode 57 may be considered as a gain control device, which, in the presence of signals above a given amplitude, will increase loop gain to a point greater than unity for signals having frequencies near the favored frequency of the loop at that time.

In order to prevent saturation of the traveling wave amplifier and consequent suppression of all but one frequency, it is necessary that the total signal power at the helix input not exceed a certain prescribed level. Since the total signal power at the helix input is equal to the sum of the signal powers supplied by the individual loops, it can be seen that as the number of oscillating loops is increased the maximum power at which each may oscillate is correspondingly decreased. This determines the level at which the second varactor diode 58 in each loop must limit. However, in most jamming situations, it is not necessary to operate in all frequency bands. Yet for effective jamming it is desirable that all available amplifier power be concentrated in those frequency bands which are being utilized. In order to do this, a sensing means 60 is provided in each loop to develop a voltage whenever its respective loop is in operation. These voltages are added in a summing amplifier 61 whose output level then represents the total number of loops in oscillation. This output voltage is then used to decrease the reverse bias on the second diode 58 in each loop. Thus, as more loops are excited into oscillation, each loop is permitted to pass less power, yet full amplifier capacity is available when jamming in only one or two frequency bands.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A multifrequency modulated signal generator comprising (a) a plurality of closed signal circulating loops each being tuned to a different frequency, (b) each of said loops sharing a common loop segment, (c) means to switch the overall gain characteristic of any given loop to a value above unity in response to signals in that loop, (d) means for initiating signals of various frequencies within said loops, (e) and means for changing the electrical length of said common loop segment.

2. A multiple frequency modulated signal generator comprising (a) a plurality of closed signal circulating loops each being tuned to a different frequency, (b) each of said loops sharing a common loop segment, (c) a wide frequency range signal amplifier arranged to amplify signals propagating in said common segment, (d) individual signal amplitude limiting means in the remaining portion of each segment, each of said limiting means being responsive to the total of the signals flowing in all of the loops, (e) means for initiating oscillatory signals of discrete frequencies within said loops, (f) and means for changing the electrical length of said common loop segment.

3. A multiple frequency modulated oscillator comprising (a) a forward signal transmission path of variable electrical length, (b) a plurality of passive feedback signal transmission paths each being tuned to a different frequency, (c) a wide frequency range signal amplification means connected to form a portion of said forward signal transmission path, said signal amplification means being capable of compensating for signal energy losses which occur in all of said feedback signal transmission paths, (d) signal amplitude limiting means arranged in each feedback signal transmission path to prevent nonlinear operation of said signal amplification means, each of said limiting means being responsive to the total of the signals flowing in all of the feedback signal transmission paths, (e) means for introducing oscillatory signals of various frequencies into said paths, (f) and means for varying the electrical length of said forward signal transmission path.

4. A multiple frequency device comprising (a) a wide frequency bandwidth signal amplification means, (b) a phase shifting means connected in series with said signal amplification means between a pair of points, (c) a plurality of feedback paths connected in parallel between said pair of points and forming oscillatory loops, each of said paths being tuned to accept signals within an exclusive frequency range and to return these signals at the same frequency to the input of the amplification means.

(d) individual signal amplitude limiting means in each feedback loop, each of said limiting means being connected to sample the signals flowing in each of the loops, (e) means for introducing oscillatory signals of various frequencies into said loops, (f) and means for actuating said phase shifting means.

5. A multiple frequency device comprising (a) a wide frequency bandwidth signal amplification means, (b) a phase shifting means connected in series with said signal amplification means between a pair of points, (c) a plurality of feedback paths connected in parallel between said pair of points and forming oscillatory loops, each of said paths being tuned to accept signals within an exclusive frequency range and to return these signals at the same frequency to the input of the amplification means.

(d) signal gain switching means in each of said feedback paths, said switching means being operable to change individual loop gain above and below unity in response to applied signals, (e) signal amplitude limiting means also connected in each of said feedback paths and operative to equalize the overall gains of the oscillating loops, (f) means for introducing oscillatory signals of various frequencies into said loops, (g) and means for actuating said phase shifting means.

6. A signal excited multiple frequency system comprising (a) a plurality of regenerative oscillatory loops having discrete electrical lengths and sharing a common loop segment, (b) a variable phase shifting means forming a portion of said common loop segment, (c) means for supplying a modulating signal to said variable phase shifting means, (d) switching means in the remaining portion of each oscillatory loop, each switching means being operative in response to incident signals above a certain amplitude and within a frequency range for which its respective oscillatory loop is regenerative to raise its loop gain above unity, (e) signal amplitude limiting means also in the remaining portion of each oscillatory loop and operative to equalize the overall gains of the oscillating loops, (f) and means for introducing externally generated signals of various frequencies and amplitudes to each of said loops.

7. A signal excited multiple frequency oscillatory system comprising a plurality of closed signal circulation channels having discrete electrical lengths and sharing a common channel segment, (a) a variable phase shifting means forming a portion of said common channel segment, (b) means for supplying a modulating signal to actuate said variable phase shifting means, (c) signal gain control means located in the individual portions of each channel and operative in response to incident signals above a given amplitude to raise the overall gain of the respective channels by a certain amount, (d) signal amplification means located in each channel and operative to recirculate signals having substantially an integral number of channel wavelengths in those channels whose overall gain has been raised by said certain amount, (e) and means for applying externally generated signals of various frequencies and amplitudes to said channels.

8. The system described in claim 7 wherein said amplification means is located in and forms a part of said common channel segment.

9. The system described in claim 7 further including frequency bandpass filters in the individual portions of each signal circulation channel, each frequency bandpass filter being operative to reduce overall channel gain below unity for all frequencies which circulate through its respective channel in other than a given oscillatory mode.

10. A signal responsive automatic noise jamming system comprising an antenna, (a) a common signal transmission path,
(b) a plurality of individual signal transmission paths of discrete electrical lengths,
(c) means connecting said antenna and one end of said common signal transmission path to one end of each of said individual signal transmission paths,
(d) means connecting the other end of each of said signal transmission paths to the other end of each of said individual signal transmission paths,
(e) signal amplitude responsive signal gain control means in each individual signal transmission path and operative to increase the transmission path signal gain characteristic in response to incident signals which exceed a given amplitude,
(f) a wide frequency range signal amplification means in said common signal transmission path and operative to provide a loop greater than unity for signals which circulate regeneratively through individual signal transmission paths having increased gain characteristics,
(g) a voltage actuable phase shifting means in said common signal transmission path,
(h) and means for continuously supplying a randomly varying voltage to said phase shifting means.

11. A frequency modulated signal responsive noise jamming system comprising (a) a traveling wave amplifier having signal input and output coupling means,
(b) a plurality of signal transmission paths of different electrical lengths connected between said input and said output coupling means, said signal transmission paths with said traveling wave amplifier forming oscillatory loops capable of recirculating unattenuated signals,
(c) an antenna connected to said output coupling means and to each of said signal transmission paths for supplying externally generated signals of various frequencies and amplitudes to said signal transmission paths,
(d) a bandpass filter located in each signal transmission path and operative to attenuate signals which recirculate within its respective signal transmission path in other than a given mode,
(e) first signal amplitude responsive means in each path and operative to attenuate all signals from said bandpass filter which occur below a given amplitude,
(f) second signal amplitude responsive means in each channel and operative to restrict maximum signal amplitude within its respective channel to prevent saturation of said traveling wave amplifier,
(g) and means for continuously varying the electrical length of said traveling wave amplifier.

12. The system described in claim 11 wherein said means for varying the electrical length of said traveling wave amplifier comprises a source of randomly varying voltages and means for applying the voltages to the slow wave structure within said traveling wave amplifier.

13. The system described in claim 11 further including means for developing a voltage proportional to the number of transmission paths recirculating signals, and means for adjusting the second signal amplitude responsive means in each channel to a maximum signal amplitude which is inversely proportional to said voltage.

References Cited by the Examiner

UNITED STATES PATENTS

| | | | |
|---|---|---|---|
| 2,674,692 | 4/1954 | Cutler | 328—155 |
| 2,770,722 | 11/1956 | Arams | 330—107 |
| 2,784,377 | 3/1957 | Hopper | 332—29 |
| 2,795,698 | 6/1957 | Cutler | 331—135 |
| 2,906,970 | 9/1959 | Wylde. | |
| 3,137,826 | 6/1964 | Boudrias | 332—29 X |

DAVID G. REDINBAUGH, *Primary Examiner.*

KATHLEEN H. CLAFFY, *Examiner.*